(12) United States Patent
Polk et al.

(10) Patent No.: US 8,129,466 B2
(45) Date of Patent: Mar. 6, 2012

(54) PIGMENT DISPERSANT

(75) Inventors: W. David Polk, Pittsburgh, PA (US);
Eldon L. Decker, Gibsonia, PA (US);
Noel R. Vanier, Wexford, PA (US);
Brian E. Woodworth, Pittsburgh, PA (US)

(73) Assignee: PPG Industries Ohio, Inc, Cleveland, OH (US)

( * ) Notice: Subject to any disclaimer, the term of this patent is extended or adjusted under 35 U.S.C. 154(b) by 585 days.

(21) Appl. No.: 12/054,821

(22) Filed: Mar. 25, 2008

(65) Prior Publication Data

US 2008/0188610 A1  Aug. 7, 2008

Related U.S. Application Data

(63) Continuation-in-part of application No. 12/023,423, filed on Jan. 31, 2008.

(60) Provisional application No. 60/899,608, filed on Feb. 5, 2007, provisional application No. 61/026,267, filed on Feb. 5, 2008, provisional application No. 61/029,641, filed on Feb. 19, 2008.

(51) Int. Cl.
*C08L 31/00* (2006.01)

(52) U.S. Cl. ........ 524/556; 524/558; 524/559; 524/560; 526/280; 526/284

(58) Field of Classification Search .................. 524/556, 524/558, 559, 560; 526/280, 284
See application file for complete search history.

(56) References Cited

U.S. PATENT DOCUMENTS

| | | | |
|---|---|---|---|
| 6,294,014 B1 | 9/2001 | Woodworth et al. | 106/499 |
| 6,306,209 B1 | 10/2001 | Woodworth et al. | 106/499 |
| 6,336,966 B1 | 1/2002 | Coca et al. | 106/499 |
| 6,365,666 B1 | 4/2002 | McCollum et al. | 524/548 |
| 6,376,597 B1 | 4/2002 | Coca et al. | 524/504 |
| 6,441,066 B1 | 8/2002 | Woodworth et al. | 524/88 |
| 6,462,125 B1 | 10/2002 | White et al. | 524/560 |
| 6,590,049 B1 | 7/2003 | O'Dwyer et al. | 526/206 |
| 6,642,301 B2 | 11/2003 | White et al. | 524/560 |
| 6,784,231 B2 | 8/2004 | Shimada et al. | |
| 2003/0030041 A1* | 2/2003 | Genjima et al. | 252/587 |
| 2003/0110982 A1* | 6/2003 | Shimada et al. | 106/496 |
| 2005/0170171 A1 | 8/2005 | Vanier | |
| 2006/0229407 A1 | 10/2006 | Vogel et al. | |

FOREIGN PATENT DOCUMENTS

| | | |
|---|---|---|
| EP | 0218436 | 4/1987 |
| JP | 04-246478 | 9/1992 |
| JP | 2002-060698 | 2/2002 |
| JP | 2002-201379 | 7/2002 |
| JP | 2004-010778 | 1/2004 |
| JP | 2005-000821 | 1/2005 |
| JP | 2005-061042 | 3/2005 |
| JP | 2007-023064 | 1/2007 |
| WO | WO 2004/090030 A1 | 10/2004 |

OTHER PUBLICATIONS

Spinelli, Harry J., Group transfer polymerization and its use in water based pigment dispersants and emulsion stabilizers, Progress in Organic Coatings 27, (1966), 255-260, Elsevier Science S.A.

* cited by examiner

*Primary Examiner* — Peter D Mulcahy
(74) *Attorney, Agent, or Firm* — Donald R. Palladino

(57) ABSTRACT

A pigment dispersant is disclosed comprising a tri-block copolymer having a first block comprising a glycidyl(meth)acrylate reacted with a napthoic acid, a second block comprising (meth)acrylic acid alkyl esters, and a third block comprising (meth)acrylic acid alkyl esters, wherein said third block is different from said second block. The dispersant is suited for use in a nanoparticulate dispersion comprising pigment particles having an average primary particle size of less than 100 nm.

22 Claims, No Drawings

PIGMENT DISPERSANT

CROSS REFERENCE TO RELATED APPLICATIONS

This application is a continuation-in-part of U.S. application Ser. No. 12/023,423 filed Jan. 31, 2008, entitled "Coating System Exhibiting Cool Dark Color", which claims the benefit of U.S. Provisional Patent Application Ser. No. 60/899,608 filed Feb. 5, 2007, entitled "Coating System Exhibiting Cool Dark Color", both of which are hereby incorporated by reference in their entireties. This application also claims the benefit of U.S. Provisional Patent Application Ser. No. 61/026,267, filed Feb. 5, 2008, and Ser. No. 61/029,641, filed Feb. 19, 2008, which are incorporated by reference herein in their entireties.

FIELD OF THE INVENTION

The present invention relates to pigment dispersions containing pigments and a pigment dispersant prepared by the controlled radical polymerization of (i) at least one radically polymerizable ethylenically unsaturated first monomer in the presence of (ii) a polymeric initiator having at least one radically transferable group. The polymeric initiator forms the polymeric backbone segment of the pigment dispersant, and the first monomer forms polymeric segments pendent to the backbone of the dispersant.

BACKGROUND OF THE INVENTION

Pigmented coating compositions are used in a wide variety of applications including, for example, corrosion resistant primers and decorative topcoats in the automotive, aerospace, industrial and appliance markets. The preparation of pigmented coating compositions generally involves mixing binder resin(s), crosslinker(s), additives, e.g., flow additives and solvents with a compatible pigment dispersion. Pigment dispersions are typically prepared by mixing dry pigment with a pigment dispersant in the presence of a carrier medium, e.g., an organic carrier medium or water. Paint compositions typically include colorant particles dispersed in a resinous binder. The paint composition may further include reflective pigments such as aluminum flake or mica or other color effect pigment compositions or substrate-hiding materials such as titanium dioxide or zinc oxide or lead oxide. The pigment particles used in conventional paints are typically on the order of one micron in size. Particles of this size absorb light at certain wavelengths and scatter light at other wavelengths. This partial absorption and partial scattering creates a degraded coloration effect when viewed by an observer.

Dry pigments are available commercially in the form of agglomerated pigment particles. Pigment agglomerates are more likely to settle out of pigment dispersions and/or pigmented coating compositions, and are accordingly undesirable. To break the pigment agglomerates down into smaller agglomerates and/or individual particles generally requires the use of energy intensive mixing means (commonly referred to as grinding), e.g., sand mills and ball mills. During the grinding process, the pigment agglomerates are broken down into smaller agglomerates and/or individual particles, the surfaces of which are wetted by the pigment dispersant. The pigment dispersant suspends or disperses the pigment particles in the carrier medium and prevents their re-agglomeration on storage. It is desirable that the pigment dispersion remain substantially stable, e.g., showing minimal pigment settling and viscosity change with time, prior to its use in the preparation of a pigmented coating composition.

Organic and inorganic pigments generally are hydrophobic. Thus, pigment dispersants used in pigment dispersions are desirably compatible with both the carrier medium (which may be hydrophilic) and the hydrophobic surfaces of the pigment particles. Such a combination of disparate properties can be achieved with a pigment dispersant having distinct hydrophobic and hydrophilic polymeric segments, i.e., having well defined polymer chain architecture. A wide variety of radically polymerizable monomers, such as methacrylate and acrylate monomers, are commercially available and can provide a wide range of properties including, for example, hydrophilic and hydrophobic properties.

The use of conventional, i.e., non-living or free, radical polymerization methods to synthesize pigment dispersants provides little control over molecular weight, molecular weight distribution and, in particular, polymer chain structure. The continued development of pigment dispersions that are stable and suitable for the preparation of aqueous pigmented coating compositions is desirable. In particular, it would be desirable to develop pigment dispersions that comprise pigment dispersants having well defined polymer chain architecture in which distinct polymer segments are present for efficient dispersion of pigment particles, both organic and inorganic.

One process of radical polymerization referred to as atom transfer radical polymerization (ATRP), described as being a living radical polymerization, results in the formation of (co)polymers having predictable molecular weight and molecular weight distribution. The ATRP process is also described as providing highly uniform products having controlled structure (i.e., controllable topology, composition, etc.). U.S. Pat. Nos. 6,365,666 and 6,642,301 describe (co)polymers prepared by ATRP, which are useful in a wide variety of applications including, for example, pigment dispersants.

SUMMARY OF THE INVENTION

The present invention includes a nanoparticulate dispersion comprising pigment particles having an average primary particle size of less than one micron; and a dispersant comprising a tri-block copolymer having (i) a first block comprising an oxirane functional monomer reacted with a carboxylic acid; (ii) a second block comprising (meth)acrylic acid alkyl esters; and (iii) a third block comprising (meth)acrylic acid alkyl esters, wherein said third block is different from said second block. Also included in the present invention is pigment dispersant comprising a tri-block copolymer having a first block comprising a glycidyl(meth)acrylate reacted with a napthoic acid, a second block comprising (meth)acrylic acid alkyl esters, and a third block comprising (meth)acrylic acid alkyl esters, wherein said third block is different from said second block.

Other than in the operating examples, or where otherwise indicated, all numbers or expressions referring to quantities of ingredients, reaction conditions, etc, used in the specification and claims are to be understood as modified in all instances by the term "about".

DETAILED DESCRIPTION OF THE INVENTION

The pigment dispersant of the present invention has a polymer chain structure represented by the following general formula I, $$\phi\text{-}(G)_p\text{-}(W)_q\text{-}(Y)_s T \qquad \text{I}$$

wherein G is a residue of at least one radically polymerizable ethylenically unsaturated monomer; W and Y are residues of at least one radically polymerizable ethylenically unsaturated monomer; with W and Y being different from one another; φ is a hydrophobic residue of or derived from the initiator, and is free of the radically transferable group; T is or is derived from the radically transferable group of the initiator; p, q and s represent average numbers of residues occurring in a block of residues; p, q and s are each individually selected such that the pigment dispersant has a number average molecular weight of at least 250.

In accordance with the present invention, there is provided a pigment dispersion comprising: (a) pigment; (b) a carrier may be selected from water, at least one organic solvent and combinations thereof; and (c) a pigment dispersant prepared by controlled radical polymerization of at least one radically polymerizable ethylenically unsaturated first monomer in the presence of a polymeric initiator having at least one radically transferable group, wherein the polymeric initiator forms a polymeric backbone segment, the first monomer forms reactive segments pendent to the polymeric backbone segment, and at least one other monomer forms pendent segments that may be hydrophobic or hydrophilic.

Pigment dispersions according to the present invention comprise pigments and one or more pigment dispersants. The pigment dispersants may be described generally as having a head and tail structure, i.e., as having a polymeric head portion and a polymeric tail portion. The polymeric tail portion may have a hydrophilic portion and a hydrophobic portion, particularly at the terminus thereof. While not intending to be bound by any theory, it is believed that the polymeric head portion of the pigment dispersant is associated with the pigment, while the polymeric tail portion is associated with the carrier of the pigment dispersion. As used herein and in the claims, the terms "hydrophobic" and "hydrophilic" are relative to each other.

ATRP Process

In an embodiment of the present invention, the pigment dispersant is prepared by atom transfer radical polymerization (ATRP). The ATRP process can be described generally as comprising: polymerizing one or more radically polymerizable monomers in the presence of an initiation system; forming a polymer; and isolating the formed polymer. In the present invention, the initiation system comprises: a monomeric initiator having a single radically transferable atom or group; a transition metal compound, i.e., a catalyst, which participates in a reversible redox cycle with the initiator; and a ligand, which coordinates with the transition metal compound. The ATRP process is described in further detail in International Patent Publication No. WO 98/40415 and U.S. Pat. Nos. 5,807,937, 5,763,548 and 5,789,487.

Catalysts that may be used in the ATRP preparation of the pigment dispersant include any transition metal compound that can participate in a redox cycle with the initiator and the growing polymer chain. It is preferred that the transition metal compound not form direct carbon-metal bonds with the polymer chain. Transition metal catalysts useful in the present invention may be represented by the following general formula II,

$$M^{n+}X_n \qquad \text{II}$$

wherein M is the transition metal, n is the formal charge on the transition metal having a value of from 0 to 7, and X is a counterion or covalently bonded component. Examples of the transition metal M include, but are not limited to, Cu, Fe, Au, Ag, Hg, Pd, Pt, Co, Mn, Ru, Mo, Nb and Zn. Examples of X include, but are not limited to, halide, hydroxy, oxygen, $C_1$-$C_6$-alkoxy, cyano, cyanato, thiocyanato and azido. A preferred transition metal is Cu(I) and X is preferably halide, e.g., chloride. Accordingly, a preferred class of transition metal catalysts is the copper halides, e.g., Cu(I)Cl. It is also preferred that the transition metal catalyst contain a small amount, e.g., 1 mole percent, of a redox conjugate, for example, Cu(II)Cl$_2$ when Cu(I)Cl is used. Additional catalysts useful in preparing the pigment dispersant are described in U.S. Pat. No. 5,807,937 at column 18, lines 29 through 56. Redox conjugates are described in further detail in U.S. Pat. No. 5,807,937 at column 11, line 1 through column 13, line 38.

Ligands that may be used in the ATRP preparation of the pigment dispersant include, but are not limited to, compounds having one or more nitrogen, oxygen, phosphorus and/or sulfur atoms, which can coordinate to the transition metal catalyst compound, e.g., through sigma and/or pi bonds. Classes of useful ligands include, but are not limited to, unsubstituted and substituted pyridines and bipyridines; porphyrins; cryptands; crown ethers; e.g., 18-crown-6; polyamines, e.g., ethylenediamine; glycols, e.g., alkylene glycols, such as ethylene glycol; carbon monoxide; and coordinating monomers, e.g., styrene, acrylonitrile and hydroxyalkyl(meth)acrylates. As used herein and in the claims, the term "(meth)acrylate" and similar terms refer to acrylates, methacrylates and mixtures of acrylates and methacrylates. A preferred class of ligands are the substituted bipyridines, e.g., 4,4'-dialkyl-bipyridyls. Additional ligands that may be used in preparing pigment dispersant are described in U.S. Pat. No. 5,807,937 at column 18, line 57 through column 21, line 43.

Classes of monomeric initiators that may be used in the ATRP preparation of the pigment dispersant include, but are not limited to, aliphatic compounds, cycloaliphatic compounds, aromatic compounds, polycyclic aromatic compounds, heterocyclic compounds, sulfonyl compounds, sulfenyl compounds, esters of carboxylic acids, nitriles, ketones, phosphonates and mixtures thereof, each having a radically transferable group, and preferably a single radically transferable group. The radically transferable group of the monomeric initiator may be selected from, for example, cyano, cyanato, thiocyanato, azido and halide groups. Preferably, the radically transferable group of the monomeric initiator is a halide. The monomeric initiator may also be substituted with functional groups, e.g., oxyranyl groups, such as glycidyl groups. Additional useful initiators are described in U.S. Pat. No. 5,807,937 at column 17, line 4 through column 18, line 28.

In an embodiment of the present invention, the monomeric initiator is selected from 1-halo-2,3-epoxypropane, p-toluenesulfonyl halide, p-toluenesulfenyl halide, $C_6$-$C_{20}$-alkyl ester of alpha-halo-$C_2$-$C_6$-carboxylic acid, halomethylbenzene, (1-haloethyl)benzene, halomethylnaphthalene, halomethylanthracene and mixtures thereof. Examples of $C_2$-$C_6$-alkyl ester of alpha-halo-$C_2$-$C_6$-carboxylic acids include, hexyl alpha-bromopropionate, 2-ethylhexyl alpha-bromopropionate, 2-ethylhexyl alpha-bromohexionate and icosanyl alpha-bromopropionate. As used herein, the term "monomeric initiator" is meant to be distinguishable from polymeric initiators, such as polyethers, polyurethanes, polyesters and acrylic polymers having radically transferable groups.

In the ATRP preparation, the pigment dispersant, the amounts and relative proportions of monomeric initiator, transition metal compound and ligand are those for which ATRP is most effectively performed. The amount of initiator used can vary widely and is typically present in the reaction medium in a concentration of from $10^{-4}$ moles/liter (M) to 3

M, for example, from $10^{-3}$ M to $10^{-1}$ M. As the molecular weight of the pigment dispersant can be directly related to the relative concentrations of initiator and monomer(s), the molar ratio of initiator to monomer is an important factor in polymer preparation. The molar ratio of initiator to monomer is typically within the range of $10^{-4}$:1 to 0.5:1, for example, $10^{-3}$:1 to 5.times.10-2:1.

In preparing the pigment dispersant by ATRP methods, the molar ratio of transition metal compound to initiator is typically in the range of $10^{-4}$ 1 to 10:1, for example, 0.1:1 to 5:1. The molar ratio of ligand to transition metal compound is typically within the range of 0.1:1 to 100:1, for example, 0.2:1 to 10:1.

The pigment dispersant may be prepared in the absence of solvent, i.e., by means of a bulk polymerization process. Generally, the pigment dispersant is prepared in the presence of a solvent, typically water and/or an organic solvent. Classes of useful organic solvents include, but are not limited to, esters of carboxylic acids, ethers, cyclic ethers, $C_5$-$C_{10}$ alkanes, $C_5$-$C_8$ cycloalkanes, aromatic hydrocarbon solvents, halogenated hydrocarbon solvents, amides, nitrites, sulfoxides, sulfones and mixtures thereof. Supercritical solvents, such as $CO_2$, $C_1$-$C_4$ alkanes and fluorocarbons, may also be employed. A preferred class of solvents is the aromatic hydrocarbon solvents, particularly preferred examples of which are xylene, toluene, and mixed aromatic solvents such as those commercially available from Exxon Chemical America under the trademark SOLVESSO. Additional solvents are described in further detail in U.S. Pat. No. 5,807,937, at column 21, line 44 through column 22, line 54.

The ATRP preparation of the pigment dispersant is typically conducted at a reaction temperature within the range of 25° C. to 140° C., e.g., from 50° C. to 100° C., and a pressure within the range of 1 to 100 atmospheres, usually at ambient pressure.

The ATRP transition metal catalyst and its associated ligand are typically separated or removed from the pigment dispersant prior to its use in the pigment dispersants of the present invention. Removal of the ATRP catalyst may be achieved using known methods, including, for example, adding a catalyst binding agent to the mixture of the pigment dispersant, solvent and catalyst, followed by filtering. Examples of suitable catalyst binding agents include, for example, alumina, silica, clay or a combination thereof. A mixture of the pigment dispersant, solvent and ATRP catalyst may be passed through a bed of catalyst binding agent. Alternatively, the ATRP catalyst may be oxidized in situ, the oxidized residue of the catalyst being retained in the pigment dispersant.

Monomers

With reference to general formula I, G is a hydrophobic residue of a monomer selected from an oxirane functional monomer reacted with a carboxylic acid which may be an aromatic carboxylic acid or polycyclic aromatic carboxylic acid, including, e.g., phenyl(meth)acrylate, p-nitrophenyl (meth)acrylate and benzyl(meth)acrylate; polycyclicaromatic (meth)acrylates, e.g., 2-naphthyl(meth)acrylate; N-(aryl) maleimide; and mixtures thereof.

The oxirane functional monomer or its residue that is reacted with a carboxylic acid may be selected from, for example, glycidyl(meth)acrylate, 3,4-epoxycyclohexylmethyl(meth)acrylate, 2-(3,4-epoxycyclohexyl)ethyl(meth) acrylate, allyl glycidyl ether and mixtures thereof. Examples of carboxylic acids that may be reacted with the oxirane functional monomer or its residue include, but are not limited to, napthoic acid, hydroxy napthoic acids, para-nitrobenzoic acid and mixtures thereof.

W and Y may each be residues of monomers independently selected from including, but not limited to, (meth)acrylic acid, (meth)acrylates, and hydroxy-functional (meth)acrylates. Examples of $C_1$-$C_{20}$-alkyl(meth)acrylates (including linear or branched alkyls and cycloalkyls) of which W and Y may each independently be residues of, include, but are not limited to, methyl(meth)acrylate, ethyl(meth)acrylate, propyl (meth)acrylate, isopropyl(meth)acrylate, n-butyl(meth)acrylate, iso-butyl(meth)acrylate, tert-butyl(meth)acrylate, 2-ethylhexyl(meth)acrylate, lauryl(meth)acrylate, isobornyl (meth)acrylate, cyclohexyl(meth)acrylate, 3,3,5-trimethylcyclohexyl(meth)acrylate and isocane(meth) acrylate.

Hydroxy alkyl(meth)acrylates having from 2 to 4 carbon atoms in the alkyl group of which W and Y may each independently be residues of include, but are not limited to, hydroxyethyl(meth)acrylate, hydroxypropyl(meth)acrylate, hydroxybutyl(meth)acrylate, and butyl(meth)acrylate. In general formula I, W and Y may each independently be residues of monomers having more than one (meth)acryloyl group, such as (meth)acrylic anhydride, diethyleneglycol bis (meth)acrylate, 4,4'-isopropylidenediphenol bis(meth)acrylate (Bisphenol A di(meth)acrylate), alkoxylated 4,4'-isopropylidenediphenol bis(meth)acrylate, trimethylolpropane tris (meth)acrylate and alkoxylated trimethylolpropane tris (meth)acrylate.

The numerals p, q and s represent the average total number of G, W and Y residues, respectively, occurring per block or segment of G residues (G-block or G-segment), W residues (W-block or W-segment) and Y residues (Y-block G or Y-segment), respectively. When containing more than one type or species of monomer residue, the W- and Y-blocks may each have at least one of random block (e.g., di-block and tri-block), alternating and gradient architectures. Gradient architecture refers to a sequence of different monomer residues that changes gradually in a systematic and predictable manner along the polymer backbone. For purposes of illustration, a W-block containing 6 residues of butyl methacrylate (BMA) and 6 residues of hydroxy propyl methacrylate (HPMA), for which q is 12, may have di-block, tetra-block, alternating and gradient architectures as described in U.S. Pat. No. 6,642,301, col. 10, lines 5-25. In one non-limiting embodiment, the G-block may include about 5-15 residues of glycidyl(meth)acrylate) reacted with an aromatic carboxylic acid (such as 3-hydroxy-2-napthoic acid), the W-block may be a random block of about 20-30 BMA and HPMA residues and the Y-block may be a uniform block of about 5-15 butyl acrylate (BA) residues.

The order in which monomer residues occur along the polymer backbone of the pigment dispersant is typically determined by the order in which the corresponding monomers are fed into the vessel in which the controlled radical polymerization is conducted. For example, the monomers that are incorporated as residues in the G-block of the pigment dispersant are generally fed into the reaction vessel prior to those monomers that are incorporated as residues in the W-block, followed by the residues of the Y-block.

During formation of the W- and Y-blocks, if more than one monomer is fed into the reaction vessel at a time, the relative reactivities of the monomers typically determines the order in which they are incorporated into the living polymer chain. Gradient sequences of monomer residues within the W- and Y-blocks can be prepared by controlled radical polymerization, and, in particular, by ATRP methods by (a) varying the ratio of monomers fed to the reaction medium during the course of the polymerization, (b) using a monomer feed containing monomers having different rates of polymerization, or (c) a combination of (a) and (b). Copolymers containing gradient architecture are described in further detail in U.S. Pat. No. 5,807,937, at column 29, line 29 through column 31, line 35.

Subscripts p, q and s represent average numbers of residues occurring in the respective G, W and Y blocks. Typically, subscripts q and s each have a value of at least 1, and preferably at least 5 for general formula I. Also, subscript s has a value of typically less than 300, preferably less than 100, and more preferably less than 50 (e.g., 20 or less) for general formula I. The values of subscripts q and s may range between any combination of these values, inclusive of the recited values, e.g., s may be a number from 1 to 100. Subscript p may have a value of at least 1, and preferably at least 5. Subscript p also typically has a value of less than 300, preferably less than 100, and more preferably less than 50 (e.g., 20 or less). The value of subscript p may range between any combination of these values, inclusive of the recited values, e.g., p may be a number up to 50. The pigment dispersant typically has a number average molecular weight (Mn) of from 250 to 40,000, e.g., from 1000 to 30,000 or from 2000 to 20,000, as determined by gel permeation chromatography using polystyrene standards.

Symbol $\phi$ of general formula I is, or is derived from, the residue of the initiator used in the preparation of the pigment dispersant by controlled radical polymerization, and is free of the radically transferable group of the initiator. For example, when the pigment dispersant is initiated in the presence of toluene sulfonyl chloride, the symbol $\phi$, more specifically $\phi$-, is the residue,

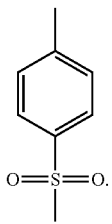

The symbol $\phi$ may also represent a derivative of the residue of the initiator.

In general formula I, T is or is derived from the radically transferable group of the ATRP initiator. The residue of the radically transferable group may be (a) left on the pigment dispersant, (b) removed or (c) chemically converted to another moiety. The radically transferable group may be removed by substitution with a nucleophilic compound, e.g., an alkali metal alkoxylate. When the residue of the radically transferable group is, for example, a cyano group (—CN), it can be converted to an amide group or carboxylic acid group by methods known in the art.

The pigment dispersant is typically present in the pigment dispersion of the present invention in an amount of at least 0.1 percent by weight, preferably at least 0.5 percent by weight, and more preferably at least 1 percent by weight, based on the total weight of the pigment dispersion. The pigment dispersant is also typically present in the pigment dispersion in an amount of less than 65 percent by weight, or less than 40 percent by weight, based on the total weight of the pigment dispersion. The amount of pigment dispersant present in the pigment dispersion of the present invention may range between any combination of these values, inclusive of the recited values.

The pigment of the pigment dispersion of the present invention may be selected from inorganic pigments, such as carbon black pigments, e.g., furnace blacks, electrically conductive carbon black pigments, extender pigments and corrosion inhibitive pigments; organic pigments and mixtures thereof. Examples of organic pigments that may be present in the pigment dispersion include, but are not limited to, perylenes, phthalo green, phthalo blue, nitroso pigments, manoazo pigments, diazo pigments, diazo condensation pigments, basic dye pigments, alkali blue pigments, blue lake pigments, phloxin pigments, quinacridone pigments, lake pigments of acid yellow 1 and 3, carbazole dioxazine violet pigments, alizarine lake pigments, vat pigments, phthaloxy amine pigments, carmine lake pigments, tetrachloroisoindolinone pigments and mixtures thereof. Inorganic pigments that may be present in the pigment dispersion, include, for example, titanium dioxide, electrically conductive titanium dioxide, and iron oxides, e.g., red iron oxide, yellow iron oxide, black iron oxide and transparent iron oxides. Extender pigments that may be present in the pigment dispersion include, but are not limited to, silicas, clays, and alkaline earth metal sulfates, such as calcium sulfate and barium sulfate. The pigment dispersion may contain corrosion inhibitive pigments, such as aluminum phosphate and calcium modified silica.

The pigment is typically present in the pigment dispersion of the present invention in an amount of at least 0.5 percent by weight, or at least 5 percent by weight, and/or at least 10 percent by weight, based on the total weight of the pigment dispersion. The pigment is also typically present in the pigment dispersion in an amount of less than 90 percent by weight, or less than 50 percent by weight, or less than 20 percent by weight, based on the total weight of the pigment dispersion. The amount of pigment present in the pigment dispersion may range between any combination of these values, inclusive of the recited values.

The pigment and pigment dispersant are typically together present in the pigment dispersion in an amount totaling from 20 percent by weight to 80 percent by weight, e.g., from 30 percent by weight to 70 percent by weight or from 40 percent by weight to 60 percent by weight. The percent weights are based on the total combined weight of the pigment and pigment dispersant. The weight ratio of pigment to pigment dispersant is typically from 0.1:1 to 100:1, e.g., from 0.2:1 to 5:1 or from 0.5:1 to 2:1.

The pigment dispersion of the present invention also comprises at least one organic solvent. Classes of organic solvents that may be present include, but are not limited to, xylene, toluene, alcohols, e.g., methanol, ethanol, n-propanol, isopropanol, n-butanol, sec-butyl alcohol, tert-butyl alcohol, isobutyl alcohol, furfuryl alcohol and tetrahydrofurfuryl alcohol; ketones or ketoalcohols, e.g., acetone, methyl ethyl ketone, and diacetone alcohol; ethers, e.g., dimethyl ether and methyl ethyl ether; cyclic ethers, e.g., tetrahydrofuran and dioxane; esters, e.g., ethyl acetate, ethyl lactate, ethylene carbonate and propylene carbonate; polyhydric alcohols, e.g., ethylene glycol, diethylene glycol, triethylene glycol, propylene glycol, tetraethylene glycol, polyethylene glycol, glycerol, 2-methyl-2,4-pentanediol and 1,2,6-hexantriol; hydroxy functional ethers of alkylene glycols, e.g., butyl 2-hydroxyethyl ether, hexyl 2-hydroxyethyl ether, methyl 2-hydroxypropyl ether and phenyl 2-hydroxypropyl ether; nitrogen containing cyclic compounds, e.g., pyrrolidone, N-methyl-2-pyrrolidone and 1,3-dimethyl-2-imidazolidinone; and sulfur containing compounds such as thioglycol, dimethyl sulfoxide and tetramethylene sulfone.

The pigment dispersion may be prepared by methods that are known to those of ordinary skill in the art. Such known methods typically involve the use of energy intensive mixing or grinding means, such as ball mills or media mills (e.g., sand mills), as described previously herein.

The pigment dispersion of the present invention is useful in the preparation of, for example, coating compositions and inks. To form a pigmented coating composition, the pigment dispersion is typically mixed together with resins, crosslinkers, additives, such as flow control agents, and additional solvents. Coating compositions into which the pigment dispersion of the present invention may be incorporated include, for example, liquid spray-, dip- and curtain-applied primer, basecoat (i.e., the basecoat in a color-plus-clear basecoat/clearcoat system) and topcoat compositions, and electrodepositable coating compositions.

The present invention is more particularly described in the following examples, which are intended to be illustrative only, since numerous modifications and variations therein will be apparent to those skilled in the art. Unless otherwise specified, all parts and percentages are by weight.

SYNTHESIS EXAMPLE A

This example describes the preparation of an acrylic dispersant, which is subsequently used to form the following pigment dispersions. The acrylic dispersant was prepared from the mixture of the following ingredients in the ratios indicated in Table A:

TABLE A

| Ingredients | Weight (grams) |
|---|---|
| Charge I | |
| n-Butyl Acetate | 1854.80 |
| 2,2"-Bipyridyl | 17.18 |
| Copper (0) Powder | 6.99 |
| Glycidyl Methacrylate | 703.89 |
| Para-Toluenesulfonyl Chloride | 104.5 |
| Charge II | |
| N-Butyl Methacrylate | 739.08 |
| Hydroxypropyl Methacrylate | 1034.21 |
| n-Butyl Acetate | 1854.80 |
| Charge III | |
| n-Butyl Acrylate | 683.79 |
| Charge IV | |
| Acetic Acid | 65.79 |
| Ion Exchange Resin* | 419.95 |
| Charge V | |
| 3-Hydroxy-2-Napthoic Acid | 526.71 |

*(AMBERLITE IRC-748I) commercially available from ALFA AESAR.

Charge I was mixed in a 12 liter round-bottomed flask fitted with an air motor stirrer, a thermocouple, nitrogen adapter, and a condenser. The mixture was then sparged with nitrogen for 15 minutes. After the sparge the reaction solution was heated under a nitrogen blanket to 70° C. and held for 1.5 hours. Charge II was mixed in an addition funnel and sparged with nitrogen for 15 minutes prior to addition. Charge II was added over the course of 15 minutes and while under nitrogen, the temperature was also increased to 80° C. and held for 1.5 hours. Charge III was then added to an addition funnel and sparged with nitrogen for 15 minutes prior to addition. Charge III was then added to the reaction over 20 minutes under nitrogen while maintaining a temperature of 80° C. The reaction was then held at 80° C. till the total solids reached 47%. The reaction mixture was then filtered though qualitative filter paper to remove the bulk copper. Charge IV was then added at 80° C. and allowed to stir for 1.5 hours while exposed to air. The ion exchange resin was then filtered off using qualitative filter paper. Charge V was then added and the reaction solution was placed under vacuum and heated to 60° C. Approximately 6.5% of the reaction solution was removed by vacuum distillation. The reaction was then returned to ambient pressure and allowed to proceed at 110° C. till the Acid Value was less than 1 meq KOH/g. The resulting material was found to be 57.3% solids with a number average molecular weight of 3627 g/mol, a weight average molecular weight of 14,979 g/mol and $M_w/M_n$ of 2.8.

PIGMENT DISPERSION EXAMPLES 1-7

Example 1

Pigment Yellow 138 (PY 138) was milled and dispersed in the mill base formula shown in Table 1, on a QM-1 QMAX Supermill (Premier Mill, SPX Process Equipment) using 0.3 mm YTZ milling media to the final % haze value shown in Table 2.

Example 2

Pigment Yellow 139 (PY 139) was milled and dispersed in the mill base formula shown in Table 1, on a QM-1 QMAX Supermill (Premier Mill, SPX Process Equipment) using 0.3 mm YTZ milling media to the final % haze value shown in Table 2.

Example 3

Pigment Red 179 (PR 179) was milled and dispersed in the mill base formula shown in Table 1, on a QM-1 QMAX Supermill (Premier Mill, SPX Process Equipment) using 0.3 mm YTZ milling media to the final % haze value shown in Table 2.

Example 4

Pigment Violet 29 (PV 29) was milled and dispersed in the mill base formula shown in Table 1, on a QM-1 QMAX Supermill (Premier Mill, SPX Process Equipment) using 0.3 mm YTZ milling media to the final % haze value shown in Table 2.

Example 5

Pigment Blue 15:3 (PB 15:3) was milled and dispersed in the mill base formula shown in Table 1, on a QM-1 QMAX Supermill (Premier Mill, SPX Process Equipment) using 0.3 mm YTZ milling media to the final % haze value shown in Table 2.

Example 6

Lumogen Black FK 4280 was milled and dispersed in the mill base formula shown in Table 1, on a QM-1 QMAX Supermill (Premier Mill, SPX Process Equipment) using 0.3 mm YTZ milling media to the final % haze value shown in Table 2.

Comparative Example 7

A conventional pigment dispersion of Lumogen Black FK 4280 was milled and dispersed in the mill base formula shown in Table 1 using a Dispermat CN F2 model dispersator with the Dispermat+TML 1 (Basketmill) attachment, using 1.2-1.7 mm Zirconox milling media, to a Hegman of 6. The final % haze value is shown in Table 2.

15:3. This paint was drawn using a #40 wire wound draw down bar (PA-4140, Byk-Gardner) onto a TRU Aluminum 04×12×038, treated unpolished coil coated white panel (APR33700, ACT Test Panels). The jetness value of the cured

TABLE 1

| Mill Base Ingredients | Weight % of Tint Formula | | | | | | |
|---|---|---|---|---|---|---|---|
| | Example 1 | Example 2 | Example 3 | Example 4 | Example 5 | Example 6 | Comparative Example 7 |
| Dispersant Example A | 29.07 | 28.92 | 25.46 | 29.98 | 29.68 | 20.07 | 20.95 |
| N-butyl acetate | 60.78 | 60.97 | 64.35 | 59.52 | 58.89 | 0 | 0 |
| Xylene | 0 | 0 | 0 | 0 | 0 | 69.92 | 0 |
| Dowanol PM acetate | 0 | 0 | 0 | 0 | 0 | 0 | 68.58 |
| Solsperse 5000 synergist (Lubrizol) | 0 | 0 | 0 | 0 | 1.05 | 0 | 0 |
| Paliotol Yellow L 0962 HD (BASF Pigments) | 10.15 | 0 | 0 | 0 | 0 | 0 | 0 |
| Paliotol Yellow L 2140 HD (BASF Pigments) | 0 | 10.11 | 0 | 0 | 0 | 0 | 0 |
| Irgazin Red 379 (Ciba Pigments) | 0 | 0 | 10.19 | 0 | 0 | 0 | 0 |
| Perrindo Violet 29 V4050 (Sun Chemical) | 0 | 0 | 0 | 10.50 | 0 | 0 | 0 |
| Heliogen Blue L7081D (BASF Pigments) | 0 | 0 | 0 | 0 | 10.38 | 0 | 0 |
| Lumogen Black FK 4280 (BASF Pigments) | 0 | 0 | 0 | 0 | 0 | 10.01 | 10.47 |

TABLE 2

| Tint Characteristics | Example 1 | Example 2 | Example 3 | Example 4 | Example 5 | Example 6 | Comparative Example 7 |
|---|---|---|---|---|---|---|---|
| % Non-volatile by weight | 39.22 | 39.03 | 35.65 | 40.48 | 41.11 | 30.08 | 15.00 |
| % Pigment by weight | 10.15 | 10.11 | 10.19 | 10.5 | 10.38 | 10.01 | 10.00 |
| % Haze* | 0.4 | 0.4 | 0.1 | 0.1 | 0.2 | 0.3 | 34.9 |

*For analysis, the final tints were diluted with solvent. The % haze was measured with an X-Rite 8400 spectrophotometer in transmittance mode with a 500 micron path-length cell. The % haze reported here is at a transmittance of about 17.5% at the wavelength of maximum absorbance.

COATING COMPOSITION EXAMPLES 8-12

Example 8

Paint was formulated using 7.15 g of PPG Industries, Inc. automotive clear coating (Diamond coat, DCT5002HC/DCT5001B) and 2.96 g of a mixture of tints consisting of: 10.14 wt % of tint from Example 1, 6.17 wt % of tint from Example 2, 12.21 wt % of tint from Example 3, 33.40 wt % of tint from Example 4, and 38.08 wt % tint from Example 5. The amount of pigment in the paint was 6 wt % of the total non-volatiles in the paint, and the weight percentage of each individual pigment on the total pigment content was 10% Pigment Yellow 138, 6% Pigment Yellow 139, 12% Pigment Red 179, 34% Pigment Violet 29, and 38% Pigment Blue paint film, percent total solar reflectance, and heat buildup of the panel were measured and are reported in Table 3.

Comparative Example 9

Example 8 was repeated to produce a painted panel, except the tint mixture was produced from a mixture of conventional tints, where the weight percentage of the pigments in the final paint was the same as in Example 8, namely, 6 wt % pigment on total non-volatiles, of which is 10% Pigment Yellow 138, 6% Pigment Yellow 139, 12% Pigment Red 179, 34% Pigment Violet 29, and 38% Pigment Blue 15:3. The panel was tested for jetness, % TSR and heat buildup as reported in Table 3. Example 8 displayed significantly improved jetness compared to Comparative Example 9.

Example 10

Paint was formulated using 7.15 g of PPG Industries, Inc. automotive clear coating (Diamond coat, DCT5002HC/DCT5001B) and 2.89 g of the tint from Example 6. The amount of pigment in the paint was 6 wt % of the total non-volatiles in the paint. This paint was drawn onto a panel as in Example 8 and tested for jetness, % TSR and heat buildup as reported in Table 3.

Comparative Example 11

Example 10 was repeated except 2.78 g of the tint from Comparative Example 7 was used instead of the tint of Example 6. The amount of pigment in the paint was 6 wt % of the total non-volatiles in the paint. This paint was drawn onto a panel as in Example 10 and tested for jetness, % TSR and heat buildup as reported in Table 3. Example 10 displayed significantly improved jetness compared to Example 11.

Comparative Example 12

As a comparative example to Examples 8-11, a carbon black-containing paint was formulated using PPG Industries, Inc. automotive clear coating (Diamond coat, DCT5002HC/DCT5001B) and a conventional black tint. The amount of carbon black pigment in the paint was 6 wt % of the total non-volatiles in the paint. This paint was drawn onto a panel as in Examples 8-11 and tested for jetness, % TSR and heat buildup as reported in Table 3. Examples 8, 9, 10, and 11 all displayed significantly improved % TSR and significantly less temperature rise above ambient temperature than Example 12.

TABLE 3

| Example | Jetness* | % TSR** | ΔTlu (° F.)*** |
|---|---|---|---|
| 8 | 299 | 32.7 | 112 |
| 9 (Comparative) | 222 | 34.7 | 112 |
| 10 | 343 | 32.8 | 115 |
| 11 (Comparative) | 234 | 34.4 | 106 |
| 12 (Comparative) | 327 | 4.3 | 149 |

*Jetness was measured by obtaining the color data from a spectrophotometer (XRite MA68, using 75° color data) and using the following formula: Jetness = 100 * ($\log_{10}(Xn/X) - \log_{10}(Yn/Y) - \log_{10}(Zn/Z)$) as discussed in K. Lippok-Lohmer, Farbe + Lack, 92, p. 1024 (1986).
**The percent total solar reflectance (% TSR) was calculated using the methods of ASTM E 903 and ASTM E 891 from data measured with a Cary 500 (Varian) spectrophotometer over the wavelength range or 300-2500 nm.
***The heat build up was quantified by the temperature rise above ambient temperature in the laboratory under a heat lamp as described in ASTM D 4803-97.

PIGMENT DISPERSION EXAMPLES 13-14

Example 13

Lumogen Black FK 4280 was milled and dispersed in the mill base formula shown in Table 4, with Duraspheres, borosilicate glass spheres 40-80 microns (GL-0179, from MoSci Corporation) in a 1.25 quart water-cooled stainless steel flask using a Lab Dispersator (Model 2000, Premier Mill) to nano-sized particles with the final % haze value shown in Table 5.

Comparative Example 14

Lumogen Black FK 4280 was milled and dispersed in the mill base formula shown in Table 4, in an 8 oz. container, using 0.7-1.2 mm Zirconox milling media, on a Red Devil shaker for 30 minutes, to a Hegman of 8, and attaining the final % haze value shown in Table 5.

TABLE 4

| | Weight % of Tint Formula | |
|---|---|---|
| Mill Base Ingredients | Example 13 | Comparative Example 14 |
| Disperbyk 2050 (Byk Additives & Instruments) | 28.58 | 35.49 |
| Xylene | 74.07 | 55.41 |
| Lumogen Black FK 4280 (BASF Pigments) | 5.35 | 9.10 |

TABLE 5

| Tint Characteristics | Example 13 | Comparative Example 14 |
|---|---|---|
| % Non-volatile by weight | 16.05 | 27.55 |
| % Pigment by weight | 5.35 | 9.10 |
| % Haze* | 3.4 | 14.5 |

*For analysis, the final tints were diluted with solvent. The % haze was measured with an X-Rite 8400 spectrophotometer in transmittance mode with a 500 micron path-length cell. The % haze reported here is at a transmittance of about 17.5% at the wavelength of maximum absorbance.

COATING COMPOSITION EXAMPLES 15-16

Example 15

Paint was formulated using 5.72 g of PPG Industries, Inc. automotive clear coating (Diamond coat, DCT5002HC/DCT5001B) and 4.32 g of the tint from Example 13. The amount of pigment in the paint was 6 wt % of the total non-volatiles in the paint. This paint was drawn using a #60 wire wound draw down bar (PA-4140, Byk-Gardner) onto a TRU Aluminum 04×12×038, treated unpolished coil coated white panel (APR33700, ACT Test Panels). The jetness, % TSR, and the heat buildup of the panel are shown in Table 6.

Comparative Example 16

As a comparative example to Example 15, paint was formulated using 5.72 g of PPG Industries, Inc. automotive clear coating (Diamond coat, DCT5002HC/DCT5001B) and 2.55 g of the tint from Comparative Example 14. The amount of pigment in the paint was 6 wt % of the total non-volatiles in the paint. This paint was drawn using a #60 wire wound draw down bar (PA-4140, Byk-Gardner) onto a TRU Aluminum 04×12×038, treated unpolished coil coated white panel (APR33700, ACT Test Panels). The jetness, % TSR, and the heat buildup of the panel are shown in Table 6. Example 15 displayed significantly improved jetness compared to Comparative Example 16.

TABLE 6

| Example | Jetness* | % TSR** | ΔTlu (° F.)*** |
|---|---|---|---|
| 15 | 265 | 34.4 | 118 |
| 16 (Comparative) | 212 | 33.4 | 113 |

*Jetness was measured by obtaining the color data from a spectrophotometer (X-Rite MA68, 75°) and using the following formula: Jetness = 100 * ($\log_{10}(Xn/X) - \log_{10}(Yn/Y) - \log_{10}(Zn/Z)$) as discussed in K. Lippok-Lohmer, Farbe + Lack, 92, p. 1024 (1986).
**The % total solar reflectance (% TSR) was calculated using the methods of ASTM E 903 and ASTM E 891 from data measured with a Cary 500 (Varian) spectrophotometer over the wavelength range or 300-2500 nm.
***The heat build up (ΔTlu) was quantified by the temperature rise above ambient temperature in the laboratory under a heat lamp as described in ASTM D 4803-97.

Comparative Example 17

White Panel

As a comparative example to the coated panels of Examples 8-12, and 16, the jetness, the % total solar reflectance (% TSR), and the heat buildup (ΔTlu) were measured on a coated white panel as used in those Examples, namely a TRU Aluminum 04×12×038, treated unpolished coil coated white panel (APR33700, ACT Test Panels). The jetness value was 11, the % TSR was 73.3 and ΔTlu was 95° F.

It will be readily appreciated by those skilled in the art that modifications may be made to the invention without departing from the concepts disclosed in the foregoing description. Such modifications are to be considered as included within the following claims unless the claims, by their language, expressly state otherwise. Accordingly, the particular embodiments described in detail herein are illustrative only and are not limiting to the scope of the invention which is to be given the full breadth of the appended claims and any and all equivalents thereof.

What is claimed is:

1. A nanoparticulate dispersion comprising:
   a) pigment particles having an average primary particle size of less than one micron; and
   b) a dispersant comprising a tri-block copolymer prepared by controlled radical polymerization and represented by the following formula, $\phi\text{-}(G)_p\text{-}(W)_q\text{-}(Y)_s\text{-}T$ wherein φ is a hydrophobic residue of or derived from a monomeric initiator, and is free of a radically transferable group,
   G is a hydrophobic residue of an oxirane functional monomer reacted with a carboxylic acid,
   W is a residue of (meth)acrylic acid alkyl esters, and $\text{-}(W)_q\text{-}$ defines a W-block,
   Y is a residue of (meth)acrylic acid alkyl esters, and $\text{-}(Y)_s\text{-}$ defines a Y-block, wherein said W-block is different from said Y-block,
   T is or is derived from the radically transferable group of said monomeric initiator, and
   p, q, and s are each independently at least 1.

2. The dispersion of claim 1 wherein said pigment particles comprise organic pigments.

3. The dispersion of claim 1 wherein said carboxylic acid comprises an aromatic carboxylic acid or a polycyclic aromatic carboxylic acid.

4. The dispersion of claim 1 wherein said carboxylic acid comprises a napthoic acid.

5. The dispersion of claim 1 wherein said dispersion has a maximum haze of 1%.

6. The dispersion of claim 1 wherein said oxirane functional monomer comprises glycidyl(meth)acrylate.

7. The dispersion of claim 1 wherein said W-block comprises residues of hydroxy functional (meth)acrylic acid alkyl esters.

8. The dispersion of claim 1 wherein said pigment particles have an average primary particle size of up to 100 nm.

9. A pigment dispersant comprising a tri-block copolymer prepared by controlled radical polymerization and represented by the following formula, $\phi\text{-}(G)_p\text{-}(W)_q\text{-}(Y)_s\text{-}T$ wherein φ is a hydrophobic residue of or derived from a monomeric initiator, and is free of a radically transferable group,
   G is a hydrophobic residue of a glycidyl(meth)acrylate reacted with a napthoic acid,
   W is a residue of (meth)acrylic acid alkyl esters, and $\text{-}(W)_q\text{-}$ defines a W-block,
   Y is a residue of (meth)acrylic acid alkyl esters, and $\text{-}(Y)_s\text{-}$ defines a Y-block, wherein said W-block is different from said Y-block,
   T is or is derived from the radically transferable group of said momomeric initiator, and
   p, q, and s are each independently at least 1.

10. The dispersant of claim 9 wherein said napthoic acid comprises hydroxy napthoic acid.

11. The dispersant of claim 9 wherein said W-block comprises residues of hydroxy functional (meth)acrylic acid alkyl esters.

12. A pigment dispersion comprising (a) pigment particles having an average primary particle size of less than one micron and (b) the dispersant of claim 9.

13. The dispersion of claim 12 wherein said pigment particles comprise organic pigments.

14. The dispersion of claim 12 wherein said dispersion has a maximum haze of 1%.

15. The dispersion of claim 12 wherein said W-block comprises residues of hydroxy functional (meth)acrylic acid alkyl esters.

16. The dispersion of claim 12 wherein said pigment particles have an average primary particle size of up to 100 nm.

17. A coating composition comprising (a) a resinous binder and (b) the pigment dispersion of claim 1.

18. The coating composition of claim 17 wherein said pigment particles comprise organic pigments.

19. The coating composition of claim 17 wherein said pigment dispersion has a maximum haze of 1%.

20. A coated article comprising an article coated with the coating composition of claim 17.

21. The nanoparticulate dispersion of claim 7, wherein said Y-block consists essentially of residues of $C_1\text{-}C_{20}$-alkyl (meth)acrylates.

22. The pigment dispersant of claim 11, wherein said Y-block consists essentially of residues of $C_1\text{-}C_{20}$-alkyl (meth)acrylates.

* * * * *